Patented Nov. 20, 1928.

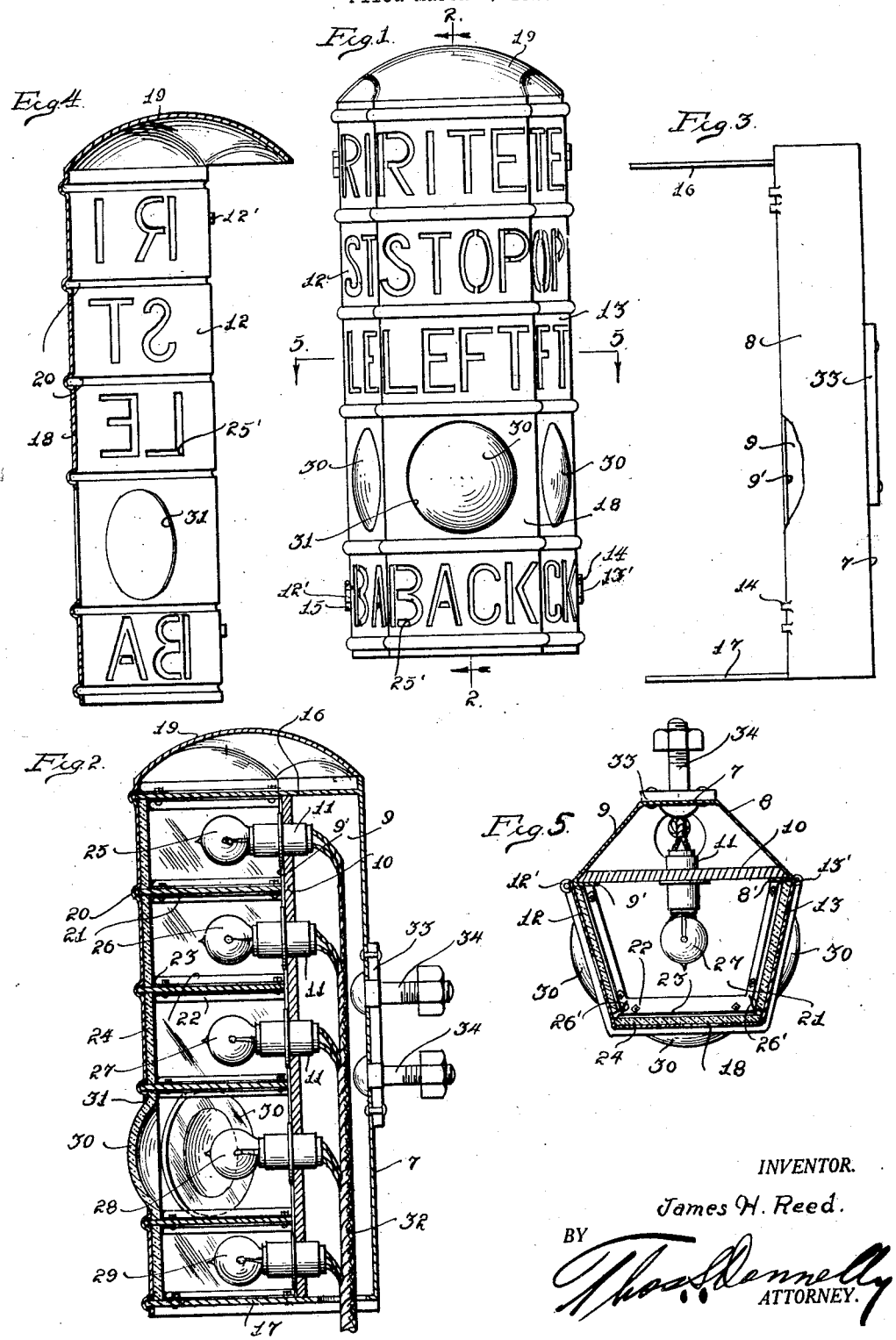

1,692,516

UNITED STATES PATENT OFFICE.

JAMES H. REED, OF DETROIT, MICHIGAN.

VEHICLE SIGNAL.

Application filed March 1, 1926. Serial No. 91,366

My invention relates to a vehicle signal and particularly the housing used in connection with the signal.

The invention is adapted for use with vehicles for, when in operation, indicating the intentions of the driver of the vehicle so that the drivers of other vehicles, as well as pedestrians, may know the intentions of the driver of the vehicle in operating the same.

It is an object of the present invention to provide a vehicle signal housing which may be mounted upon a vehicle in any convenient place so that it may be visible either to the rear or from the front and from the sides of the vehicle, having display members visible from the front, rear and sides, separably displayed for indicating the driver's intention.

Another object of the invention is the provision in a vehicle signal of this class of a housing which will be simple in structure, economical of manufacture and highly efficient in use.

Another object of the invention is the provision in a vehicle signal of this class of a housing having a plurality of slidably mounted partition forming members forming the housing into a plurality of non-communicating compartments, each of the partition forming members having resilient means for retaining a transparent closure in operative position.

Another object of the invention is the provision of a housing of this class which consists of a pair of main cooperating parts, one of the parts forming the rearward part of the housing and the other the forward portion of the housing.

Other objects will appear hereinafter.

The invention consists in the combination and arrangement of parts hereinafter described and claimed.

The invention will be best understood from a reference to the accompanying drawings which form a part of this specification and in which, Fig. 1 is a front elevational view of the invention.

Fig. 2 is a fragmentary sectional view taken on substantially line 2—2 of Fig. 1.

Fig. 3 is a side elevational view of the back portion of the housing with a portion broken away.

Fig. 4 is a sectional view of the forward portion of the housing.

Fig. 5 is a sectional view taken on substantially line 5—5 of Fig. 1.

In the form shown in the drawing the housing is illustrated as comprising a hexagon, the housing proper consisting of two portions, each portion made from a single piece of material. The rearward portion comprises the rear wall 7 and side walls 8 and 9, each of which has its edge turned inwardly to form the inwardly projecting flange 8' and 9' respectively. Embraced between the walls 8 and 9 at its edges and the flanges 8' and 9' is a supporting member 10 through which is projected a plurality of sockets 11. The forward portion of the housing which is made from a single piece of metal comprises the side walls 12 and 13, each of which is hingedly connected to the edges of the side walls 8 and 9, the side walls 12 and 13 being provided with extending tongues and curved to form knuckles 12' and 13' respectively which cooperate with knuckles 14 and 15 formed integral with the side walls 8 and 9. The rear wall 7 is extended at both ends and angularly turned to form the top portion 16 and the bottom portion 17. A portion of the front wall 18 is angularly turned to form a top 19. The side walls 12, 13 and the front wall 18 are each provided with grooves 20, in which is slidably mounted a plate 21, upon which is secured strips 22 having upturned edges 23 to form resilient bearing members to engage transparent closures 24 which are positioned against the inner surface of the front wall 18 and the side walls 12 and 13, to provide closures for indicating openings 25' which are formed in the front wall 18 and the side walls 12 and 13. It will be noted that the strips 22 are positioned upon the upper and lower surface of each of the plates 21 excepting the lower plate and upper plate, these strips being positioned on the lower surface of the upper plate and the upper surface of the lower plate.

It will be noted that the upturned flanges 23 on the strips are separated at the corners as at 26', the strip being U-shaped with the leg forming portions slightly spread apart to conform to the shape of the forward portion of the housing. By inserting the plate 21 into each of the grooves 23 the housing is divided into a plurality of non-communicating compartments so that the light bulb 25 serves to illuminate the upper compartment, the light bulb 26, the next lower compartment, the light bulb 27, the next lower compartment, the light bulb 28, the next lower compartment and the light bulb 29, the lowermost compartment. The light from each of these compartments is permitted to emanate from the compartment through the openings 25' and the transparent closures 24.

It will be noted that one of the compartments is provided with a lens 30 which serves as a closure for openings 31 formed in the front wall 18 and in the side walls 12 and 13, each of these openings having its own lens 30.

As shown in Fig. 2 each of the sockets 11 is connected by suitable wiring 32 to a suitable source of electrical energy, suitable switches being provided for closing the circuit to the various light bulbs shown. The structure of these switches is not shown as the same forms no part of the present invention and may be of any conventional type. The switches, however, should be located in a convenient place for operation, the light bulb 26 being preferably lit upon the application of the brake of the vehicle and the light bulb 28 being lit at all times when the vehicle is in operation.

Mounted upon the rear wall 7 is a reinforcing plate 33 through which may be projected bolts 34 for attaching the housing to a suitable support in a suitable location.

It is believed to be evident that the structure of the housing is one which permits of considerable economy in its manufacture being formed as it is from the two main parts forming the rearward portion and the forward portion of the housing. The method of dividing the housing into the various compartments is also believed to be a simple one while at the same time it is quite effective for the purposes intended. The provision of the resilient angularly turned flanges is such as to retain the transparent closures 24 in position so that rattling of these various parts is prevented. By having the corners as at 26' separated the resiliency of these strips as a whole is retained at its maximum efficiency so that the legs of the U-shaped formation tend to spread farther apart than normally permitted when positioned within the housing as shown.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:

1. In a vehicle signal housing of the class described a rear portion having a rear wall and side walls inclined to said rear wall and diverging outwardly therefrom; inwardly directed flanges on the longitudinal edges of said inclined side walls; and a supporting member extending between said side walls and engaging at its ends the inner surface of said sides and on one face the inner surfaces of said flanges.

2. A vehicle signal housing of the class described having a rear portion comprising a rear wall; inclined side walls mounted on said rear wall, said side walls diverging outwardly from said rear wall; a forward portion comprising a front wall; side walls inclined to and diverging outwardly from said front wall, said side walls on said forward portion engaging at their longitudinal edges the longitudinal edges of said side walls of said rearward portion; a top formed on said forward portion and extending rearwardly thereof beyond the rear edge of said forward portion to cover said rearward portion; an angularly turned portion on the upper end of said rear wall extending forwardly thereof and projecting forwardly of the rear of said forward portion below said top; and an angularly turned portion on the lower end of said rear wall extending forwardly thereof and projecting forwardly of the rear of said forward portion to provide a bottom for said housing; and means for connecting said forward portion to said rearward portion.

In testimony whereof I have signed the foregoing.

JAMES H. REED.